:::: {.columns}
::: {.column}
3,682,614
SYNERGISTIC HERBICIDAL COMPOSITION FOR THE SELECTIVE CONTROL OF WEEDS IN CEREALS Helmuth Hack, Cologne-Buchheim, Ludwig Eue, Cologne-Stammheim, and Werner Schafer, Leverkusen-Steinbuechel, Germany (all % Farbenfabriken Bayer Aktiengesellschaft, Leverkusen, Germany)
No Drawing. Continuation of application Ser. No. 760,680, Sept. 18, 1968. This application June 9, 1970, Ser. No. 44,875
Claims priority, application Germany, Sept. 21, 1967, P 16 42 274.5
Int. Cl. A01n 9/22
U.S. Cl. 71—90                    12 Claims

ABSTRACT OF THE DISCLOSURE

Synergistic combination of 1-(benzothiazol-2'-yl)-1,3-dimethyl-urea and 2-(chloro and methyl)-4-chloro-phenoxy-(acetic and α-propionic) acid salts and esters, which possesses synergistic herbicidal properties especially for the selective control of weeds in cereal cultivations.

---

This application is a continuation of Ser. No. 760,680 filed Sept. 18, 1968, now abandoned.

The present invention relates to and has for its objects the provision for new herbicidal compositions in the form of synergistic combinations of certain individually known compounds, which combinations possess outstanding herbicidal properties, optionally in the form of carrier composition mixtures of such synergistic combinations with solid and/or liquid dispersible carrier vehicles, and methods for using such synergistic combinations in a new way especially for combating weeds, e.g. in cereal cultivation, with other further objects becoming apparent from a study of the within specification and accompanying examples.

It is known that 1-(benzothiazol-2'-yl)-1,3-dimethyl-urea (1a) can be used as a herbicide (see U.S. Pat. 2,756,135 and Belgian Pat. 687,019).

Furthermore, it is known that phenoxycarboxylic acids (2a) can be used as herbicides, particularly in cereals (see U.S. Pats. 2,740,810 and 2,322,760 and British Pat. 822,199). The following phenoxycarboxylic acids have attained substantial practical importance: 2,4-dichloro-phenoxyacetic acid and 2-methyl-4-chloro-phenoxyacetic acid, as well as corresponding α-phenoxy-propionic acids.

Both such phenoxycarboxylic acids (2a) and such urea (1a) are selective herbicides and thus have the disadvantage that, when used as selective herbicides, they do not adequately destroy or control all of the numerous types of weeds which occur in cereal cultivations. Understandably, those weeds which are uncontrolled then spread unusually rapidly, since they grow without further rivalry from the other weeds, and thus tend to negate the initial advantage of a given herbicidal treatment.

It has been found, in accordance with the present invention, that new herbicidal compositions which comprise synergistic combinations of the active compounds.

(i) 1-(benzothiazol-2'-yl)-1,3-dimethyl-urea having the formula:
:::
::: {.column}
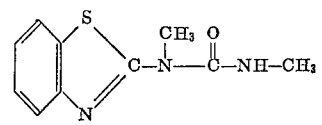

(1a)

and (ii) a phenoxycarboxylic acid compound having the formula:

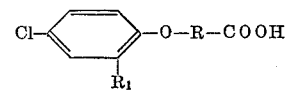

(2a)

in which

R is methylene or methylmethylene (i.e. ethylidene) and $R_1$ is chloro or methyl, said phenoxycarboxylic acid compound being in the form of a member selected from the group consisting of the corresponding alkali metal salt, lower alkyl amine salt and lower alkoxy-lower alkyl ester, in admixture in a ratio by weight of (i) to (ii) of substantially between 1:2 and 4:1, possess an especially broad and selective herbicidal activity in agricultural crops, especially among cereals.

Surprisingly, the herbicidal effectiveness of the new synergistic combinations of active compounds according to the present invention is substantially higher than the sum of the separate effects of the individual active compounds. This is not merely a supplementary or additive effect but rather a genuine synergistic effect which was not to be foreseen. Significantly, this synergistic effect is particularly great when limited to specific ratios of concentration as noted above.

Advantageously, the synergistic combinations of active compounds according to the present invention are markedly superior to known active compounds such as the phenoxycarboxylic acids conventionally used for weed control in agricultural crops, for example, cereals. The instant synergistic combinations of active compounds thus constitute a valuable addition to the art of weed control agents, especially in cereal cultivation.

The ratio by weight of the active compounds in the instant synergistic combinations may be varied within a certain crtical range. In general, the given combination of active compounds contains substantially between about 33–80%, and preferably about 40–66%, by weight of 1-(benzothiazol-2'-yl)-1,3-dimethyl-urea, with the remainder being such phenoxycarboxylic acid compound. The ratio by weight of 1-(benzothiazol-2'-yl)-1,3-dimethyl-urea to such phenoxycarboxylic acid compound thus lies, as aforesaid, between about 1:2 and about 4:1, and preferably between about 1:1.5 and 2:1, i.e. 0.5–4:1, and preferably 0.67–2:1.

Advantageously, the instant synergistic combinations of active compounds have a very favorable herbicidal activity against weeds, without damaging the agricultural crops, especially cereals. They can, therefore, be used as markedly good selective herbicides.

The term "weeds" as used herein is to be considered in the widest sense and thus is to be understood to mean all plants which usually occur as contamination of agri-
:::
::::

cultural crops, especially of cereal crops, or as otherwise undesired plants or vegation for the particular purposes in question.

As phenoxycarboxylic acid compounds according to Formula 2a, there may be mentioned the following, i.e. in terms of the free acids: 2,4-dichloro-phenoxyacetic acid, α-(2,4 - dichloro-phenoxy) - propionic acid, 2-methyl-4-chloro-phenoxyacetic acid and α-(2-methyl-4-chloro-phenoxy)-propionic acid. Particular compounds which are preferred include the potassium, sodium and monomethylamine salt of α-(2,4-dichloro-phenoxy)-propionic acid; the sodium, potassium and monomethylamine salt of α-(2-methyl-4-chloro-phenoxy)-propionic acid; the sodium, potassium and dimethylamine salt and the butylglycolester of 2,4-dichloro-phenoxyacetic acid; and the sodium, potassium and dimethylamine salt of 2-methyl-4-chloro-phenoxyacetic acid.

As is known, it is in principle the acid radical which acts herbicidally in the derivatives of the phenoxycarboxylic acids. For this reason it is understandable that the different derivatives mentioned are usable instead of the pure acid. The statements of amount, such as amounts in the foregoing ratios and the amounts actually applied, always refer herein however to the free acids. The instant derivatives can advantageously be more simply formulated than the free acids.

The phenoxycarboxylic acids as well as their derivatives mentioned have been long known as herbicides, and some of them have attained great practical importance (see German Pats. 915,876, 940,946 and 949,912 as well as German published patents (DAS) 1,064,286, 1,071,411 and 1,121,403).

In the synergistic combinations of active compounds according to the invention, there may be used any of the previously known derivatives of the acids. Particularly suitable are salts of potassium, of sodium, of the three methyl amines, i.e. mono-, di- and tri-methylamines, as well as esters of aliphatic alcohols, in particular of alkoxyalkyl alcohols, for example butylglycol alcohol. Some preferred compounds have already been mentioned above.

Thus, in Formula 2a above, R is methylene or methylmethylene $R_1$ is chloro or methyl, and the compounds are the corresponding alkali metal salts such as the Na, K, Li, etc., salts; the corresponding lower alkylamine salts such as the mono-, di- and tri-, same or different, $C_{1-4}$ alkylamine salts including the methyl, ethyl, n- and iso-propyl, n-, iso-, sec.- and/or tert.-butyl, and the like, mono-, di- and tri-substituted amine salts; or corresponding lower alkoxy-lower alkyl esters such as the $C_{1-4}$ alkoxy-$C_{1-4}$ alkyl esters, including the methoxy, ethoxy, n- and iso-propoxy, n-, iso-, sec.- and tert.-butoxy, and the like, substituted methyl to tert.-butyl inclusive, and the like, as defined above, esters. Thus, the —COOH radical may be designated —COOZ to define the corresponding phenoxycarboxylic acid alkali metal or lower alkylamine salt or lower alkoxy-lower alkyl ester moiety.

Advantageousy, the synergistic combinations of active compounds according to the present invention show a very marked activity against weeds, without harming cereal species, in particular barley, wheat, rye and maize.

As weeds which are destroyed by the synergistic combinations according to the present invention and which often occur in cereals, there are mentioned for example: Dicotyledoneae, such as knotgrass (*Polygonum aviculare*), cornflower (*Centaurea cyanus*), cleavers (*Galium aparine*), corn poppy (*Papaver rhoeas*), fumitory (*Fumaria officinalis*), common forget-me-not (*Myosotis arvensis*), deadnettle (*Lamium* spec.), Buxbaum's speedwell (*Veronica persica*), corn spurrey (*Spergula arvensis*), dove's foot cranesbill (*Geranium molle*), and Monocotyledoneae, such as silky bent-grass (*Apera spica-venti*) and annual bluegrass (*Poa annua*); and the like.

The particular synergistic combinations of active compounds according to the instant invention can be utilized, if desired, in the form of the usual formulations or compositions with conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the synergistic combination of active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.) and/or water; as well as dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As concerns commercially marketed preparations, these generally contemplate carrier composition overall mixtures in which the synergistic combination of active compounds is present in a total amount substantially between about 0.1–95%, and preferably 0.5–90%, by weight of the overall carrier composition extended mixture, whereas overall carrier composition mixtures suitable for direct application or field application generally contemplate those in which the synergistic combination of active compounds is present, e.g. in the form of a dosage unit preparation containing substantially between about 0.5–4, and preferably 1–3, kilograms of the synergistic combination per hectare of soil being treated. Thus, the present invention contemplates selective herbicidal compositions which comprise overall carrier composition extended mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the synergistic combination of active compounds, e.g. in a ratio of 0.5–4:1 therebetween, which is effective for the purpose in question and which is generally between about 0.1–95% by weight of the overall carrier composition extended mixture. Specifically, the synergistic combination of the active compounds may be applied in the form of a herbicidal composition to a surface area, for example, to agricultural soil for selective weed control in agricultural crops, such as in post-emergence use, in concentrations such that said synergistic combination is distributed in a dosage of substantially between about 0.5–4 kg. per hectare of soil being treated, preferably 1–3 kg. per hectare, although it will be appreciated that in connection with the pre-emergence use of the instant compounds, as well as the post-emergence use thereof, the concentration may be varied within a fairly wide range, depending on various factors such as the composition of the synergistic combination, the conditions of cultivation, soil, weeds, e.g. in cereal cultivation, weather, and the like. However, generally the pre-emergence range of concentration of the synergistic combination will be 0.1–95% by weight of the overall mixture as aforesaid, while the post-emergence range of such synergistic combination will be between about 0.5–4 kg. per hectare, as aforesaid, i.e. with or without the carrier vehicle.

Furthermore, the present invention contemplates methods of selectively controlling or combating undesired plants, e.g. weeds and the like, especially in cereal cultivation, which comprise applying to at least one of (a) such weeds and (b) their habitat, i.e. the locus to be protected, a herbicidally effective amount of a herbicidal composition containing the particular synergistic combination of active compounds of the invention alone or together in an overall mixture with a carrier vehicle as noted above. The instant formulations or compositions are applied in the usual manner, for example, by spraying, atomizing, scattering, dusting, watering, sprinkling, vaporizing, and the like, whether for post-emergence application to the weeds, which is the preferred procedure, or pre-emergence application to the soil, and generally in amounts such that, regardless of the presence or absence of the carrier vehicle, and/or other compatible active agents, substantially between about 0.5–4 kg. of the synergistic combination are distributed per hectare of soil being treated.

The favorable herbicidal effect of the instant combinations of active compounds can be seen from the following examples. Whereas the individual active compounds exhibit deficiencies with regard to their herbicidal effect, the instant synergistic combinations have a very broad activity against weeds, which exceeds the mere sum of the individual effects.

In the case of selective herbicides, a synergistic effect is always considered to be present when, with the same amounts applied, the herbicidal effect of the given combination of active compounds on the weeds is equal to or greater than the herbicidal effect of the more effective individual active compound alone, while at the same time the herbicidal effectiveness of the combination of active compounds on the cultivated plant itself is equal to or less than the herbicidal effectiveness on such cultivated plant of that individual active compound which is most compatible with the cultivated plant. In these cases, therefore, the selectivity, and thus the herbicidal index, is clearly increased. In the case of combinations of active compounds without synergistic effect, a mere broadening of the spectrum of activity is expected, but not an increase of the selectivity. Generally, without synergism, the sum of the effects to be expected from a given combination of active compounds understandably depends on the mixing ratio and lies between the individual effect of the less effective and that of the more effective active compound.

From the tables of the examples it can be clearly seen that the combinations of active compounds according to the invention show a genuine synergistic effect. The herbicidal effect of the combinations of active compounds is always higher than the herbicidal activity of the more effective individual active compound.

EXAMPLE 1

Post-emergence test/outdoors/spray powder

Inert carrier material: 0.25 part by weight kaolin and silicic acid (3:1)
Protective colloid: 0.02 part by weight lignin sulfate
Dispersion auxiliary: 0.15 part by weight hydroxyarylsulfonic acid formaldehyde condensate.

To produce a suitable active compound preparation, 1 part by weight of the active compound combination was mixed with the stated amounts of the foregoing formulation auxiliaries, and the resulting concentrate was then diluted with water to the desired final concentration.

Plots outdoors with test plants which had a height of about 3–10 cm. were sprayed with such an amount of the active compound preparation that a uniform wetting of the plants occurred. The amount of active compound applied per unit area is decisive. After three weeks the degree of damage of the plants was determined and characterized by the values 0.5, which have the following meaning:

0, no effect
1, a few slightly burnt spots
2, marked damage to leaves
3, some leaves and parts of stalks partially dead
4, plant partially destroyed
5, plant completely dead.

The active compounds or synergistic combinations tested, the amounts used and the results obtained can be seen from the following Tables 1a and 1b.

TABLE 1a

Post-emergence test (outdoors)

| Active compound | Amount applied in kg./hectare | Wheat | Maize | Poa annua | Apera spica-venti | Centaurea cyanus | Fumaria officinalis | Polygonum aviculare | Lamium spec. | Geranium molle |
|---|---|---|---|---|---|---|---|---|---|---|
| (1a) [structure: benzothiazole with C–N(CH$_3$)–C(O)–NH–CH$_3$] (known). | 3 | 0 | 0–1 | 5 | 5 | 3 | 4 | 5 | 5 | 5 |
|  | 2.5 | 0 | 0 | 4 | 4–5 | 2 | 3 | 4 | 4 | 4 |
|  | 2 | 0 | 0 | 3–4 | 3–4 | 1–2 | 2–3 | 3–4 | 3–4 | 3–4 |
| (2a$_1$) Cl–C$_6$H$_3$(Cl)–O–CH$_2$–COOH as sodium salt (known). | 3 | 0 | 2–3 | 0 | 0 | 5 | 5 | 4–5 | 3 | 3 |
|  | 2.5 | 0 | 2 | 0 | 0 | 4–5 | 4 | 4 | 2 | 2–3 |
|  | 2 | 0 | 1 | 0 | 0 | 4 | 4 | 3–4 | 1 | 2 |
| (2a$_2$) Cl–C$_6$H$_3$(CH$_3$)–O–CH$_2$–COOH as sodium salt (known). | 3 | 0 | 2 | 0 | 0 | 5 | 5 | 3–4 | 2 | 3 |
|  | 2.5 | 0 | 1–2 | 0 | 0 | 4–5 | 4 | 3 | 1–2 | 2 |
|  | 2 | 0 | 1 | 0 | 0 | 3–4 | 3–4 | 2 | 1 | 2 |
| Mixture of (1a) and (2a$_1$) (sodium salt) (according to invention) Weight ratio 2:1. | 3 | 0 | 0–1 | 5 | 5 | 5 | 5 | 5 | 5 | 5 |
|  | 2.5 | 0 | 0 | 4 | 4–5 | 4–5 | 4–5 | 4–5 | 4–5 | 4 |
|  | 2 | 0 | 0 | 3–4 | 3–4 | 4 | 4 | 4 | 4 | 3–4 |
| Mixture of (1a) and (2a$_2$) (sodium salt) (according to invention) Weight ratio 2:1. | 3 | 0 | 0–1 | 5 | 5 | 5 | 5 | 5 | 5 | 5 |
|  | 2.5 | 0 | 0 | 4 | 4–5 | 4–5 | 4 | 4 | 4 | 4–5 |
|  | 2 | 0 | 0 | 3–4 | 3–4 | 4 | 4 | 3–4 | 3–4 | 4 |

TABLE 1b
Post-emergence test (outdoors)

| Active compound | Amount applied in kg./hectare | Barley | Rye | Apera spica-venti | Galium aparine | Papaver rhoeas | Myosotis arvensis | Veronica persicaria | Spergula arvensis |
|---|---|---|---|---|---|---|---|---|---|
| (1a) 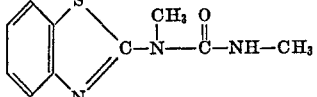 (known). | 3<br>2.5<br>2 | 0-1<br>0<br>0 | 1<br>0<br>0 | 5<br>4-5<br>3-4 | 3-4<br>3<br>2-3 | 5<br>4<br>3 | 5<br>3-4<br>3 | 4-5<br>4<br>3-4 | 5<br>4<br>3 |
| (2a₃) 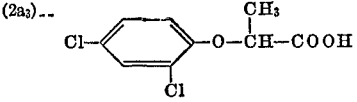 as potassium salt (known). | 3<br>2.5<br>2 | 0<br>0<br>0 | 1-2<br>0<br>0 | 0<br>0<br>0 | 4<br>3-4<br>3 | 5<br>4<br>3-4 | 3<br>2-3<br>2-3 | 3<br>2-3<br>2 | 4<br>3-4<br>3 |
| (2a₄) 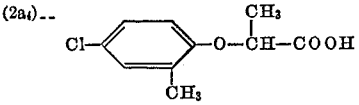 as potassium salt (known). | 3<br>2.5<br>2 | 0<br>0<br>0 | 1-2<br>0-1<br>0 | 0<br>0<br>0 | 4-5<br>4<br>3-4 | 5<br>4<br>3-4 | 3<br>2-3<br>2 | 3<br>2<br>1-2 | 3<br>2-3<br>2-3 |
| Mixture of (1a) and (2a₃) (potassium salt) (according to invention) Weight ratio 2:1. | 3<br>2.5<br>2 | 0<br>0<br>0 | 0<br>0<br>0 | 5<br>4-5<br>3-4 | 4<br>4<br>3-4 | 5<br>4<br>3-4 | 5<br>4<br>3 | 5<br>4<br>4 | 5<br>4-5<br>3-4 |
| Mixture of (1a) and (2a₄) (potassium salt) (according to invention) Weight ratio 2:1. | 3<br>2.5<br>2 | 0<br>0<br>0 | 0<br>0<br>0 | 5<br>4-5<br>3-4 | 4-5<br>4<br>4 | 5<br>4<br>3-4 | 5<br>4<br>3 | 5<br>4<br>4 | 5<br>4<br>3-4 |

EXAMPLE 2

This example was carried out in a manner similar to that of Example 1. The active compounds tested, the amounts used and the results obtained can be seen from the following Tables 2a and 2b:

TABLE 2a
Post-emergence test

| Active compound | Concentration of active compound in percent | Galinsoga parviflora | Urtica urens | Stellaria media | Wheat | Barley |
|---|---|---|---|---|---|---|
| (1a) 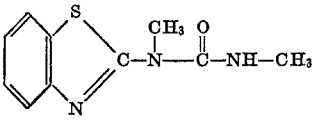 (known). | 0.1 | 3.0 | 4.0 | 4.2 | 0 | 0.2 |
| (2a₁) 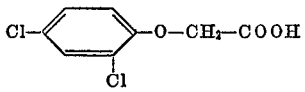 as sodium salt (known). | 0.1 | 2.0 | 4.1 | 0.6 | 0 | 0 |
| (2a₅) 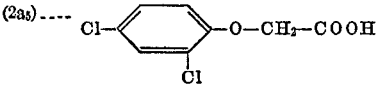 as butylglycol ester (known). | 0.1 | 4.0 | 3.8 | 2.8 | 0 | 0 |
| Mixture of (1a) plus (2a₁) (sodium salt) (according to invention) Weight ratio: | | | | | | |
| 4:1 | 0.1 | 5 | 5 | 5 | 0 | 0 |
| 2:1 | 0.1 | 4.8 | 5 | 4.8 | 0 | 0 |
| 1:1.5 | 0.1 | 4.8 | 5 | 4.5 | 0 | 0 |
| 1:2 | 0.1 | 4 | 4.5 | 4 | 0 | 0 |
| Mixture of (1a) plus (2a₅) (ester) (according to invention) Weight ratio: | | | | | | |
| 4:1 | 0.1 | 5 | 5 | 5 | 0 | 0 |
| 2:1 | 0.1 | 5 | 5 | 4.8 | 0 | 0 |
| 1:1.5 | 0.1 | 4.8 | 4.8 | 4.7 | 0 | 0 |
| 1:2 | 0.1 | 4.5 | 4.2 | 4.5 | 0 | 0 |

TABLE 2b
Post-emergence test

| Active compound | Concentration of active compound in percent | Wheat | Rye | Urtica urena | Stellaria media | Galinsoga parviflora | Galium aparine |
|---|---|---|---|---|---|---|---|
| (1a) benzothiazol urea structure (known) | 0.1 | 0 | 0.5 | 4 | 4.2 | 3.0 | 2.5 |
| (2a₄) Cl-phenoxy-CH(CH₃)-COOH as sodium salt (known) | 0.1 | 0 | 0.4 | 2.5 | 4.0 | 2.8 | 3.8 |
| (2a₇) dichlorophenoxy-CH(CH₃)-COOH as monomethylamine salt (known) | 0.1 | 0 | 0.2 | 2.8 | 4.0 | 3.5 | 3.8 |
| Mixture of (1a) plus (2a₄) (sodium salt) (according to invention) Weight ratio: | | | | | | | |
| 4:1 | 0.1 | 0 | 0.4 | 5 | 5 | 5 | 3.8 |
| 2:1 | 0.1 | 0 | 0.3 | 5 | 5 | 4.5 | 4.0 |
| 1:1.5 | 0.1 | 0 | 0.3 | 4.5 | 4.8 | 4.0 | 4.0 |
| 1:2 | 0.1 | 0 | 0.3 | 4.0 | 4.3 | 3.5 | 4.2 |
| Mixture of (1a) plus (2a₇) (monomethylamine salt) (according to invention) Weight ratio: | | | | | | | |
| 4:1 | 0.1 | 0 | 0.2 | 5 | 5 | 4.5 | 3.8 |
| 2:1 | 0.1 | 0 | 0.2 | 5 | 5 | 4.2 | 4.0 |
| 1:1.5 | 0.1 | 0 | 0.1 | 4.8 | 4.8 | 4.0 | 4.2 |
| 1:2 | 0.1 | 0 | 0.2 | 4.0 | 4.5 | 3.5 | 4.2 |

It will be realized by the artisan that all of the foregoing synergistic compositions of active compound combinations contemplated by the present invention possess the desired selective herbicidal properties, as well as a comparatively low toxicity toward warm-blooded creatures and a concomitantly low higher plant phytotoxicity, enabling such synergistic combinations of active compounds to be used with correspondingly favorable compatibility with warm-blooded creatures and higher plants for more effective control and/or elimination of weeds, especially in cereal cultivation, by application of such synergistic combinations of active compounds to such weeds and/or their habitat. Nevertheless, the instant synergistic combinations possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Synergistic herbicidal composition which consists essentially of an effective amount of a synergistic combination of
   (i) 1-(benzothiazol-2'-yl)-1,3-dimethyl-urea having the formula

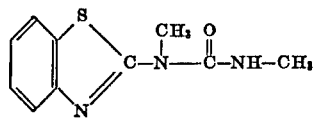

and (ii) a phenoxycarboxylic acid compound having the formula

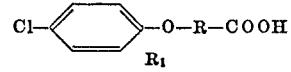

in which R is selected from the group consisting of methylene and methylmethylene and $R_1$ is selected from the group consisting of chloro and methyl, said phenoxycarboxylic acid compound being in the form of a member selected from the group consisting of the corresponding alkali metal salt, lower alkylamine salt and lower alkoxy-lower alkyl ester, in admixture in a ratio by weight of (i) to (ii) of substantially between about 0.5–4:1.

2. Composition according to claim 1 wherein said ratio by weight is between about 0.67–2:1.

3. Composition according to claim 1 wherein said synergistic combination is in the form of a carrier composition mixture with a dispersible carrier vehicle, in which said synergistic combination is present in a herbicidally effective amount.

4. Composition according to claim 1 wherein said synergistic combination is in the form of a carrier composition mixture with a dispersible carrier vehcle, in which said synergistic combination is present in a herbicidally effective amount and constitutes substantially between about 0.1–95% by weight of the carrier composition mixture.

5. Composition according to claim 1 wherein said synergistic combination is in the form of a carrier composition mixture with a dispersible carrier vehicle selected from the group consisting of (1) a dispersible finely divided carrier solid and (2) a dispersible carrier liquid selected from the group consisting of an organic solvent, water and mixtures thereof containing a surface-active agent selected from the group consisting of anionic emulsifying agents, non-ionic emulsifying agents, dispersing agents, and mixtures of such agents, in which said synergistic combination is present in a herbicidally effective amount and constitutes substantially between about 0.1–95% by weight of the carrier composition mixture.

6. Method of using a composition according to claim 1 for combating weeds which comprises applying to at least one of (a) such weeds and (b) their habitat, a herbicidally effective amount of such herbicidal composition containing a synergistic combination according to claim 1.

7. Method according to claim 6 wherein said ratio by weight is between about 0.67–2:1.

8. Method according to claim 6 wherein said synergistic combination is used in the form of a carrier composition mixture with a dispersible carrier vehicle, in which said synergistic combination is present in a herbicidally effective amount.

9. Method according to claim 6 wherein said synergistic combination is used in the form of a carrier composition mixture with a dispersible carrier vehicle, in which said synergistic combination is present in a herbicidally effective amount and constitutes substantially between about 0.1–95% by weight of the carrier composition mixture.

10. Method according to claim 6 wherein said synergistic combination is used in the form of a carrier composition mixture with a dispersible carrier vehicle selected from the group consisting of (1) a dispersible finely divided carrier solid and (2) a disposable carrier liquid selected from the group consisting of an organic solvent, water and mixtures thereof containing a surface-active agent selected from the group consisting of anionic emulsifying agents, non-ionic emulsifying agents, dispersing agents, and mixtures of such agents, in which said synergistic combination is present in a herbicidally effective amount and constitutes substantially between about 0.1–95% by weight of the carrier composition mixture.

11. Method according to claim 6 wherein said herbicidal composition is applied to agricultural soil for selective weed control in agricultural crops, in an amount such that said synergistic combination is distributed in a dosage of substantially between about 0.5–4 kg./hectare of soil being treated.

12. Method of using a composition according to claim 1 for combating weeds in cereals which comprises applying to at least one of (a) such weeds and (b) their cereal habitat, a herbicidally effective amount of a herbicidal composition containing a synergistic combination of (i) 1-(benzothiazol-2'-yl)-1,3-dimethyl-urea having the formula

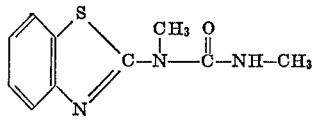

and (ii) a phenoxycarboxylic acid compound having the formula

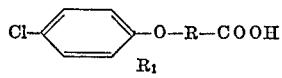

in which R is selected from the group consisting of methylene and methylmethylene and $R_1$ is selected from the group consisting of chloro and methyl, said phenoxycarboxylic acid compound being in the form of a member selected from the group consisting of the corresponding alkali metal salt, lower alkylamine salt and lower alkoxy-lower alkyl ester, in admixture in a ratio by weight of (i) to (ii) of substantially between about 0.5–4:1.

References Cited

UNITED STATES PATENTS

| | | | |
|---|---|---|---|
| 3,151,970 | 10/1964 | Lush et al. | 71—116 |
| 2,756,135 | 7/1956 | Searle | 71—90 |
| 2,709,648 | 5/1955 | Ryker et al. | 71—117 |
| 2,396,513 | 3/1946 | Jones | 71—117 |

LEWIS GOTTS, Primary Examiner

C. L. MILLS, Assistant Examiner

U.S. Cl. X.R.

71—108, 109, 110, 116, 117

UNITED STATES PATENT OFFICE
CERTIFICATE OF CORRECTION

Patent No. 3,682,614          Dated August 8, 1972

Inventor(s) Helmuth Hack et al

It is certified that error appears in the above-identified patent and that said Letters Patent are hereby corrected as shown below:

Col. 1

Patent should be identified as being Assigned to "FARBENFABRIKEN BAYER AKTIENGESELLSCHAFT, Leverkusen, Germany".

Col. 2, line 45

"crtical" should be -- critical --.

Col. 3, line 2

"vegation" should be -- vegetation --.

Col. 3, line 42 after "methylene" insert -- ; --.

Col. 3, line 57

"Advantageousy" should be -- Advantageously --.

Col. 3, line 65

"cleavers" should be -- cleaver --.

UNITED STATES PATENT OFFICE
CERTIFICATE OF CORRECTION

Patent No. 3,682,614          Dated August 8, 1972

Inventor(s) Helmuth Hack et al          - 2 -

It is certified that error appears in the above-identified patent and that said Letters Patent are hereby corrected as shown below:

Col. 6, line 37

"0.5" should be -- 0-5 --.

Col. 9, Active compound 1a in Table

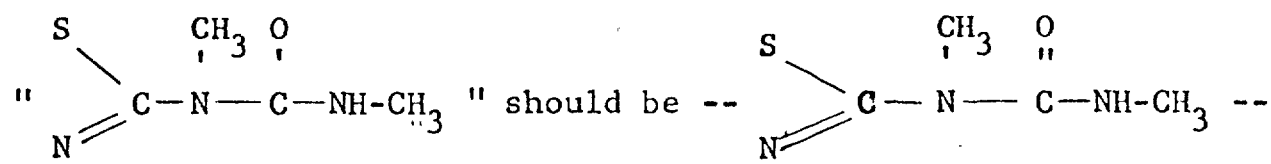

Col. 10, line 60

"vehcle" should be -- vehicle --.

Signed and sealed this 24th day of April 1973.

(SEAL)
Attest:

EDWARD M. FLETCHER, JR.          ROBERT GOTTSCHALK
Attesting Officer                Commissioner of Patents